July 27, 1943.     C. E. JOHNSON ET AL     2,325,323
VARIABLE SPEED TRANSMISSION DEVICE
Filed April 5, 1941     3 Sheets-Sheet 1

INVENTORS
CARL E. JOHNSON
EARL MENDENHALL
BERNHARD N. PALM
BY
HARRIS, KIECH, FOSTER & HARRIS
FOR THE FIRM
ATTORNEYS

July 27, 1943.   C. E. JOHNSON ET AL   2,325,323
VARIABLE SPEED TRANSMISSION DEVICE
Filed April 5, 1941   3 Sheets-Sheet 2

INVENTORS
CARL E. JOHNSON
EARL MENDENHALL
BERNHARD N. PALM
BY
HARRIS, KIECH, FOSTER & HARRIS
FOR THE FIRM
ATTORNEYS

July 27, 1943.  C. E. JOHNSON ET AL  2,325,323
VARIABLE SPEED TRANSMISSION DEVICE
Filed April 5, 1941   3 Sheets-Sheet 3
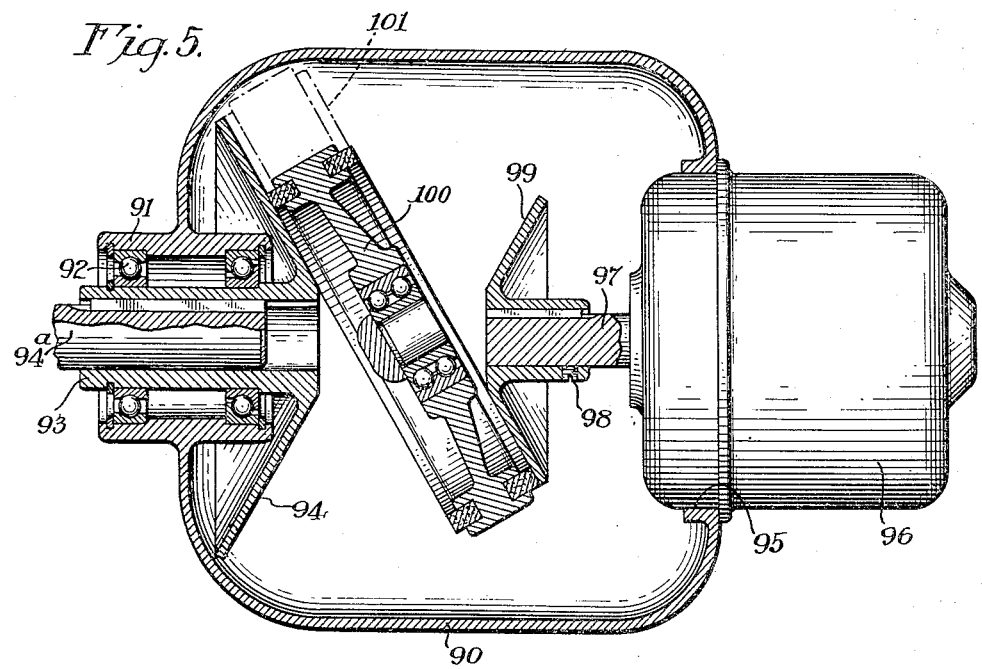
INVENTORS
CARL E. JOHNSON
EARL MENDENHALL
BERNHARD N. PALM
BY
HARRIS, KIECH, FOSTER & HARRIS
ATTORNEYS Patented July 27, 1943

2,325,323

UNITED STATES PATENT OFFICE 2,325,323

VARIABLE-SPEED TRANSMISSION DEVICE

Carl E. Johnson, San Marino, Earl Mendenhall, San Gabriel, and Bernhard N. Palm, San Marino, Calif., assignors to Sterling Electric Motors, Inc., Los Angeles, Calif., a corporation of California Application April 5, 1941, Serial No. 387,042

8 Claims. (Cl. 74—200)

Our invention relates to the variable-speed transmission art, and more particularly to a variable-speed transmission device including mechanism connecting two rotating shafts for varying the rotational speed of one relative to the other.

In the variable-speed transmission art, a commonly used type of mechanism is the V-belt transmission, in which two or more V-type pulleys are provided on suitable shafting and are operatively connected by suitable belting, there being adjustment mechanism provided for axially moving at least one flange of at least one pulley to vary the effective diameter of such pulley. The provision of even two of such V-type pulleys connected by a belt requires considerable space within which to mount the transmission mechanism, and requires a relatively large number of expensive parts. These are disadvantages common to all V-belt variable-speed transmissions, and it is a primary object of our invention to provide a transmission device which will accomplish the same ultimate results as said prior art devices but in a greatly superior manner and in which the transmission mechanism may be housed in a space materially smaller than has heretofore been required in such prior art devices.

A more specific object of our invention is to provide a variable-speed transmission having a drive shaft and a driven shaft and a plate member mounted on each of the shafts, including a rotatable ring mechanism engaging both of the plate members and adapted to transmit rotational movement of the drive shaft to the driven shaft, there being means provided for moving the ring mechanism so as to vary the speed ratio between the drive and driven shafts.

Another object of our invention is to provide a device as described hereinabove in which the drive and driven shafts are axially aligned so as to permit installation of the device in a line of shafting.

A further object of the invention is to provide a device as above described, in which the drive and driven shafts, or either of them, are connected to their respective plate members so as to permit relative axial movement between each shaft and its plate member, but preventing relative rotary movement therebetween, whereby the transmission device is not required to be rigidly connected to either the drive or driven shaft.

Another object of our invention is to provide a transmission device as hereinabove described, in which indicating means are provided for indicating the power transmitting pressure of engagement of the rotatable ring against the plate members.

Still another object of our invention is to provide a variable-speed transmission mechanism including first and second flanges of the conical type normally used in variable-diameter V-pulleys arranged so as to provide a V therebetween, the inner portions thereof being spaced apart, and a rotatable ring mechanism, one side of which engages the conical face of the first flange and the other side of which engages the conical face of the second flange, and means for moving the rotatable ring bodily in a direction perpendicular to its axis of rotation, to adjust the points at which the sides of the ring engage the conical flange faces.

It is another object of the invention to provide a transmission device as hereinabove described in which means are provided for varying the pressure of power transmitting engagement of the rotatable ring with the engaging faces of the plate members, and it is also an object to supply such a device in which this may be accomplished during power transmitting operation of the device.

A further object of the invention is to provide a transmission device of the type hereinabove described in which the device is housed in a casing having an opening in one wall thereof, and in which the transmission ring mechanism is carried on a cover adapted to close the opening in the housing, so that the transmission ring mechanism may be removed bodily from the device by merely removing the cover. This construction is advantageous in that it permits ready removal of the ring mechanism for repairs and replacement and permits ready access to the mechanism in the housing.

Another object of our invention is to provide a transmission device having a rotatable flange provided with a conical engaging face, and an annular power transmitting ring element, one side of which engages the conical engaging face in power transmitting relation therewith, the power transmitting ring being rotatable on an axis which is set at an angle with the axis of the rotatable flange of 90° less the angle the conical engaging face makes with the axis of the flange.

It is also an object of our invention to provide a transmission device having a rotatable flange provided with a conical engaging face, and an annular power transmitting ring element, one side of which engages the conical engaging face in power transmitting relation therewith, the axis of the ring element being in the same direction from the center point of the arc of engagement between the ring element and the engaging face as the direction in which the axis of the rotatable flange is from such center point. This relative disposition of the flange and ring element is advantageous in some designs, because it increases the area of contact between the flange and the ring element over what such area of contact would be if the direction of the axis of the ring element from the center point of the arc of engagement were reversed.

Another object of the invention is to provide a transmission device as hereinabove described including a pair of plates or flanges and a transmission ring element operatively connecting the plates or flanges in power transmitting relation, in which the parts are so disposed that both plates or flanges rotate in the same direction.

A further object of the invention is to provide a transmission device of the type described hereinabove including a power transmission ring mechanism and means for moving it relative to the plate members for varying the relative speeds of the plate members, in which the transmission ring mechanism is so designed and constructed that all of the torque exerted on the ring mechanism by its power transmitting engagement with the plate members is put solely on the rotational axis of the transmission ring mechanism.

Another object of our invention is to provide a variable-speed transmission device of the character hereinabove described in which an indicating mechanism is provided for indicating the relative speed ratio between the two plate members or flanges.

Another object of the invention is to provide a transmission device of the type described hereinabove, in which an electric motor is directly coupled to one of the plate members and is mounted directly on the transmission housing.

Still another object of our invention is to provide a transmission device of the type described hereinabove including a pair of relatively rotatable plate members operatively connected by a power transmission ring mechanism, one of the plate members being a driving plate member adapted to be operatively connected to a source of power, and the other of the plate members being a driven plate member adapted to be operatively connected to a device to be driven, in which the driven plate member has a substantially larger maximum effective diameter than said driving plate member.

A still further object of the invention is to provide a transmission device of the character described hereinabove, in which the rotational speed of the power transmission ring mechanism never exceeds the rotational speed of the driving plate member, which we accomplish by making the radius of the transmission ring greater than the maximum effective radius of the driving plate member. Although this feature is of particular advantage in designing our device for many types of installations, it will be understood that we do not desire to be limited thereto.

Another object of our invention is to provide a transmission device as hereinabove described, including a power transmission ring mechanism which is movable to vary the speed relation between the plate members engaged thereby, in which adjustable stop means are provided to limit the speed adjusting movement of the transmission ring mechanism between adjustable predetermined limits.

Other objects and advantages will appear from the following specification and the drawings, which are for the purpose of illustration only, and in which:

Fig. 5 is a downwardly directed horizontal view, partly in section, showing an alternative form of our device.

Figure 1:
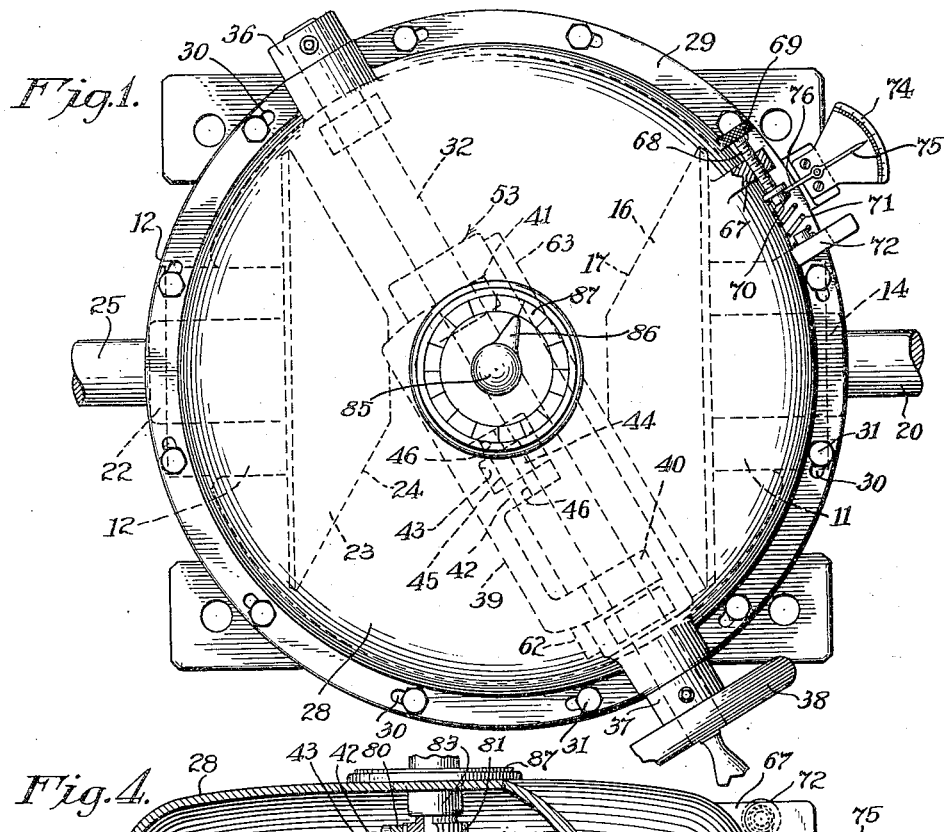
Fig. 1 is a plan view of our invention.
Figure 4:
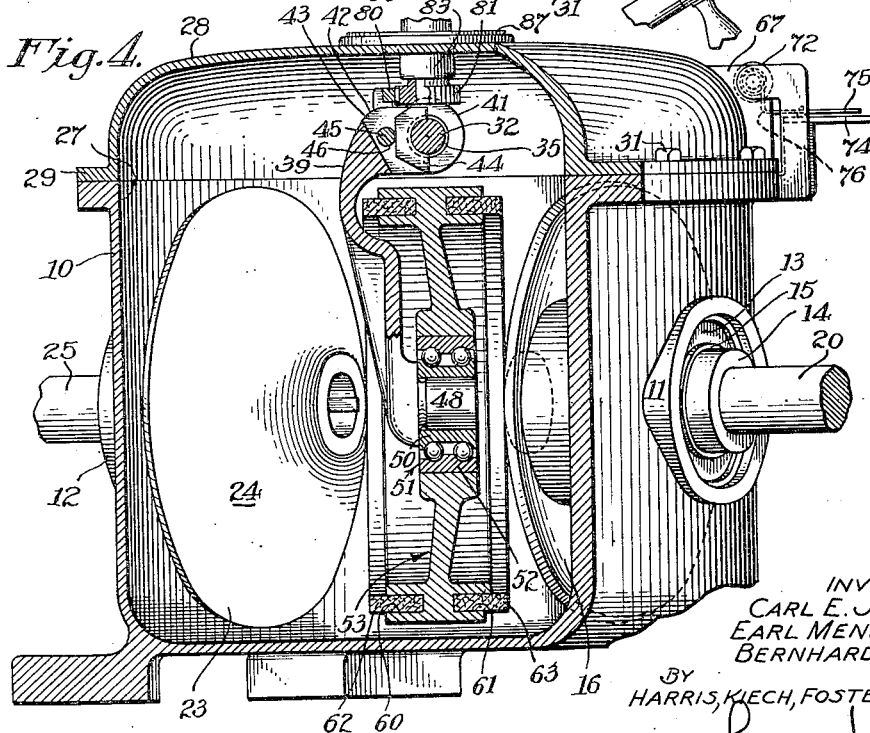
Fig. 4 is a vertical sectional view taken on the line 4—4 of Fig. 2.

Referring to the drawings, we show a housing 10 having cylindrical bearing flanges 11 and 12 formed on each side thereof and axially aligned. Fixed in the bearing flange 11 are ball bearings 13 which journal a first sleeve 14 which is fixed against axial movement relative to the ball bearings by suitable snap rings 15. Carried on the inner end of the first sleeve 14 is a first plate member or flange 16, preferably formed integrally therewith, which has an outwardly sloping conical engaging face 17. The first sleeve 14 is provided with a keyway 18 adapted to receive a key 19 for holding a driven shaft 20 against rotational movement relative thereto but permitting axial movement therebetween.

The cylindrical bearing flange 12 is similar in all respects to the bearing flange 11 and carries ball bearings 21 which journal a second sleeve 22 on the inner end of which is formed a second plate member or flange 23 having an outwardly sloping conical engaging face 24, the flange 23 being in all respects identical with the first flange 16, but oppositely disposed. The second sleeve 22 receives a drive shaft 25 and is suitably keyed thereto in the same manner that the first sleeve 14 is keyed to the driven shaft 20. It will thus be appreciated that the drive and driven shafts 25 and 20 may be moved axially relative to their respective sleeves without affecting the driving connection therebetween, which is an important feature for installation purposes in that the inner ends of the shafts do not have to be accurately spaced apart. It will also be noted that the sleeves 14 and 22 are axially aligned so that the device may be installed directly in a line of shafting, and that since the shafts 20 and 25 are merely keyed into the sleeves, it is not necessary to have the shafts of any exact length or to have the adjacent ends thereof any set distance apart in installing our device, which are features of the invention.

Formed in the top of the housing 10 is an opening 27, preferably circular in form, which is provided with a cover plate 28. The cover plate 28 is provided with an annular flange 29 in which are formed a plurality of spaced arcuate slots 30 through each of which extends a bolt 31 which is threaded into the top of the housing 10, the bolts 31 being provided to hold the cover plate 28 relative to the top of the housing. By loosening the bolts 31, it will be appreciated that the cover plate 28 may be rotated slightly on a vertical axis relative to the housing 10, and that by removing the bolts 31 the cover plate may be readily removed from the housing so as to provide access to the interior thereof through the opening 27.

Carried on the cover plate 28 and extending diametrically thereacross is a control rod 32, the ends of which are journaled in suitable openings 33 and 34 formed in the cover plate. The control rod 32 is provided with threads 35 on its central portion, and the control rod is fixed against axial movement relative to the cover plate by a collar 36 suitably fixed to one end thereof and a collar 37 fixed to the other end thereof, the collar 37 being provided with a handwheel 38 by which the control rod 35 may be rotated.

Figure 3:
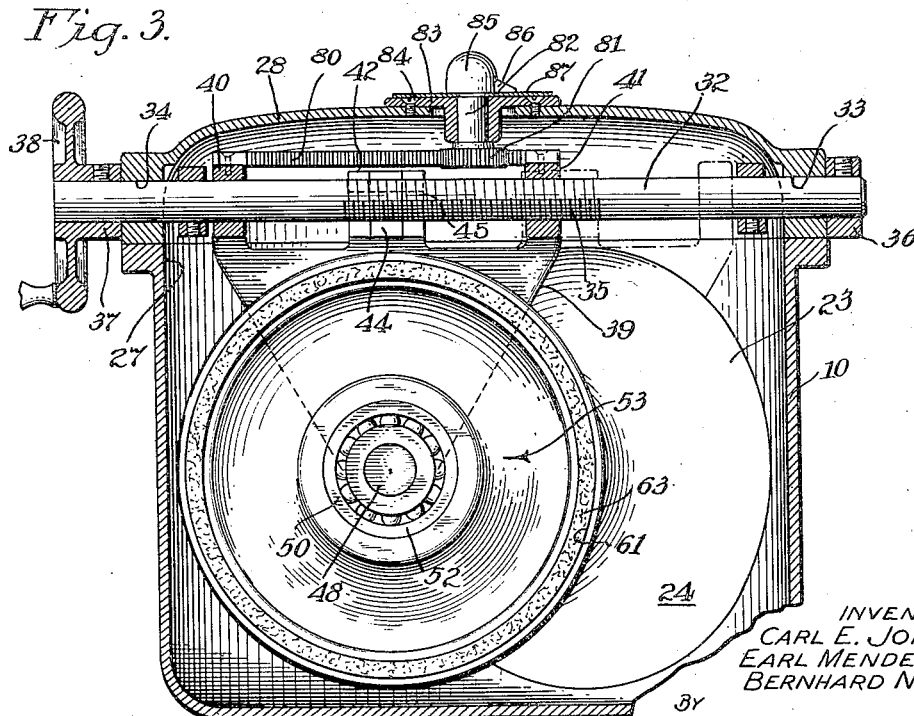
Fig. 3 is a vertical sectional view taken on the line 3—3 of Fig. 2.

Supported on the control rod 32 is a supporting arm member 39, having collars 40 and 41 thereon which ride on the control rod, and having a central bracket 42. The central bracket 42 is provided with a milled slot 43 which receives a threaded half-nut 44 which threadedly engages the threaded portion 35 of the control rod, the half-nut being held in engagement with the control rod by a pin 45 passing therebehind in holes 46 formed in the bracket 42. By removing the pin 45, the half-nut 44 may be readily removed from the control rod to permit axial movement of the supporting arm member 39 relative to the control rod. Attached to or formed on the lower end of the supporting arm member 39 is a stub axle 48 on which is provided an inner race 50 of an annular ball bearing unit 51, on the outer race 52 of which is carried a transmission ring 53. The transmission ring 53 is annular in form, as best shown in Fig. 3, and is not fixed to the outer race 52 of the ball bearing unit 51 so that relative axial movement is permitted therebetween so as to permit the transmission ring to find its own center on the outer race.

The outer end of the transmission ring 53 is provided at its sides with circular slots 60 and 61 in which are disposed engagement rings 62 and 63, respectively. The engagement rings 62 and 63 are preferably formed of a material which will provide a high coefficient of friction with the flanges 16 and 23. When the flanges 16 and 23 are formed of steel, the engagement rings 62 and 63 may be formed of a resilient material, such as rubber, although it is to be understood that any suitable material may be substituted therefor or for the flanges 16 and 23 without departing from the spirit of our invention.

Figure 2:
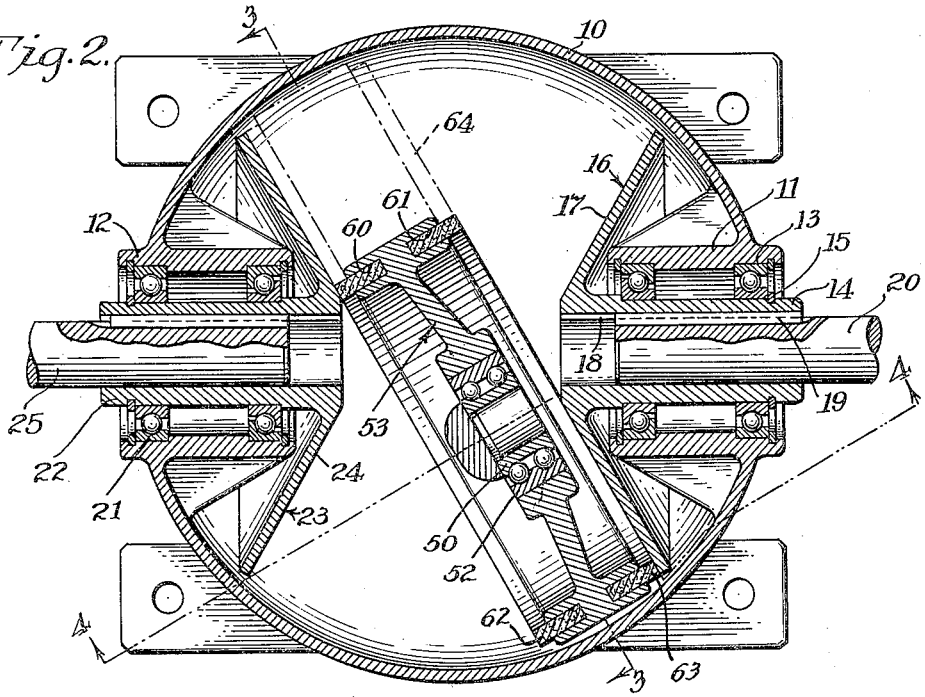
Fig. 2 is a downwardly directed horizontal sectional view taken on the axis of the shafts shown in Fig. 1.

As will be noted from Fig. 1, the axis of the control rod 32 is disposed so that it is substantially parallel to one side of the engaging face 17 and the other side of the engaging face 24 of the flanges 16 and 23, respectively, which provides a mounting for the transmission ring 53 such that the transmission ring may be moved perpendicular to its axis but parallel to the engaging faces 17 and 24. Also, as shown in Fig. 2, the engagement ring 62 engages the engaging face 24 of the second flange 23, and the engagement ring 63 engages the engaging face 17 of the first flange 16. Since the transmission ring 53 engages the flanges 16 and 23 at diametrically opposite points, all of the torque exerted on the ring mechanism by its power transmitting engagement with the flanges is put solely on the axis of the stub axle 98, which is desirable.

It is important to note that by our construction and disposition of parts the area of engagement between the engagement rings 62 and 63 and the engaging faces 24 and 17, respectively, is maintained at a maximum so as to increase the torque which may be transmitted therebetween. This is accomplished by the fact that the axes of the flanges 16 and 23 in all positions of adjustment of the transmission ring 53 extend through the circle defined by the circumference of the transmission ring 53. More broadly stated, the axis of the transmission ring 53 is at all times disposed in the same direction from either of the points of engagement of the engaging rings 60 or 63 with the engaging faces 24 or 17, respectively, as the direction in which the axis of either of the flanges 16 or 23 is from its center point of engagement with its respective engagement ring.

It will be understood that rotation of the control rod 32 by means of the handwheel 38 will axially move the supporting arm member 39 and the transmission ring 53 carried thereby between the position shown in full lines in Fig. 2 and the position indicated by dotted lines 64 thereof. When the transmission ring 53 occupies the position shown in full lines in Fig. 2, it will be noted that the engagement ring 63 engages the engaging face 17 of the flange 16 on the outermost edge of the engaging face 17 and that the engagement ring 62 engages the engaging face 24 of the second flange 23 at the innermost point on the engaging face 24. It will thus be appreciated that as the transmission ring 53 is moved from the position shown in full lines to that shown by the dotted lines 64 in Fig. 2, the engagement ring 63 will move inwardly on the engaging face 17 of the first flange 16 and the engagement ring 62 will move outwardly on the engaging face 24 of the second flange 23.

Rotation of the drive shaft 25 is directly communicated through the key 19 to the second flange 23, causing rotation thereof. Rotation of the second flange 23 is communicated through the engagement ring 62 to the transmission ring 53, causing the same to rotate on the ball bearing unit 51 around the stub axle 48. Such rotation of the transmission ring 53 is communicated through the engagement ring 63 to the first flange 16, causing the same to rotate the driven shaft 20. It will thus be understood that transverse adjustment of the position of the transmission ring 53 by movement of the control rod 35 will vary the speed ratio between the drive and driven shafts 25 and 20 due to the variation in the effective power transmission diameters of the flanges 23 and 16 caused by transverse adjustment of the transmission ring relative thereto. It is also to be noted that the drive and driven shafts 25 and 20 are both rotated in the same direction, which is an advantage in many installations.

As will be understood, in initially assembling our device, the cover plate 28 is rotated in a counterclockwise direction, as seen in Fig. 1, relative to the housing 10 so as to bring the engagement rings 62 and 63 into tight pressure engagement with the flanges 23 and 16, respectively. For this purpose, we provide a special setting mechanism, which is shown in Fig. 1 and which will now be described. Formed on the rim of the flange 29 of the cover plate 28 is a radially disposed lug 67 through which is threaded an adjustment screw 68 provided with an outer knurled head 69 by which the adjustment screw may be manually rotated, and provided with an inner engaging head 70 which engages a stiff compression spring 71, the other end of which abuts against a suitable lug 72 formed on the top of the housing 10. Rotation of the adjustment screw 68 in a direction to advance the same against the tension in the compression spring 71 causes the cover plate 28 to rotate in a counterclockwise direction on its axis, as seen in Fig. 1, to increase the pressure with which the engagement rings 62 and 63 engage the flanges 23 and 16, respectively. The arcuate slots 30 and the bolts 31 constitute guiding means for guiding the rotation of the cover plate 28 relative to the housing 10, and it will be noted that this adjustment can readily be made during operation of the device, which is an advantage. Also secured to the top of the housing 10 is a calibrated scale plate 74 having a pointer 75 pivoted thereto so that the outer end of the pointer registers with the scale on the scale plate 74, and the inner end 76 engages the engaging head 70 of the adjustment screw 68 and is held in engagement therewith by the compression spring 71. It will thus be appreciated that rotation of the cover plate 28 relative to the housing 10 will be communicated through the lug 67 and the adjustment screw 68, the latter of which has been set, to the pointer 75 to indicate the pressure existing between the engagement rings 62 and 63 and the flanges 24 and 16, respectively. Thus, the scale plate 74 and its associated parts constitute an indicating means in our invention whereby the pressure set on the transmission ring 53, rotating it into engagement with the flanges 16 and 23, may be indicated to avoid under or over setting. Following the initial setting of the cover plate 28 relative to the housing 10, the bolts 31 may be tightened so as to rigidly clamp the cover plate to the housing, or, if desired, the bolts 31 may be left relatively loose so that as the engagement rings 62 and 63 wear through use and the transmission ring 53 rotates slightly in a counterclockwise direction due to the tendency of the compression spring to rotate the cover plate through the adjustment screw 68 and the lug 67, such movement due to wear of the engagement rings will be communicated to the pointer 75 to cause the same to rotate on its pivot and indicate on the calibrated scale plate 74 a change in position from the initial setting. Thus, the calibrated scale plate may also be used to indicate the degree of wear of the engagement rings 62 and 63, which enables an operator to reset the pressure of engagement of the engagement rings with the flanges 24 and 16 by subsequent adjustment of the adjustment screw 68. It will thus be appreciated that as the sides of the engagement rings 62 and 63 wear away during operation, the drop in engagement pressure caused thereby may be compensated for by manual adjustment of the adjustment screw 68, to keep the device at all times operating with the desired pressure between the engagement rings and the flanges.

Also provided in the device is a speed indicating means for indicating the relative speed ratio between the drive and driven shafts 25 and 20. This includes a rack member 80 rigidly fixed to the upper faces of the collars 40 and 41 and a gear 81 meshing therewith, the gear being mounted on a short vertical axle 82 journaled in a sleeve member 83 fixed, as by screws 84, to the top of the cover plate 28. The upper end of the short vertical axle 82 is provided with a fixed cap 85 having a pointer 86 which registers with a calibrated scale formed on a plate 87, as best shown in Fig. 1. The scale of the plate 87 is preferably calibrated to indicate the relative speed ratio between the drive and driven shafts 25 and 20, although it will be apparent that it may be calibrated in terms of revolutions per minute of the driven shaft 20 or any other convenient scale. When the collars 40 and 41 are moved axially by rotation of the control rod 32 to change the speed setting of the device, the rack 80 is similarly moved axially, which rotates the gear 81 and consequently the axle 82 and pointer 86 connected thereto, to indicate on the scale plate 87 the amount of the change in speed setting.

It is also to be noted that since the control rod 32 is mounted in the cover plate 28, and since the transmission ring 53 is supported thereon by the supporting arm member 39, removal of the cover plate from the housing 10 will also effect removal of the transmission ring and the indicating mechanism. This is an important feature of the device in that it permits ready replacement or repair of the working parts, particularly the engagement rings 62 and 63.

Fig. 5 shows an alternative embodiment of our invention, in which a housing 90 is provided with a cylindrical bearing flange 91 having ball bearings 92 therein rotatably supporting a sleeve 93, on the inner end of which is formed a plate member or flange 94 similar to the flange 23. A driven shaft 94a is received in the sleeve 93, similarly to the shaft 25. The opposite wall of the housing 90 is provided with a wall opening 95 in which an electric motor 96 is supported, the motor having a drive shaft 97 extending into the housing on which is fixed, as by means of a setscrew 98, a plate member or flange 99, generally similar to the flange 16. It will be noted, however, that in the embodiment shown in Fig. 5 the drive flange 99 has a substantially shorter radius than the driven flange 94. Positioned between the flanges 94 and 99, and in engagement therewith, is a transmission ring structure 100 which is in all respects identical in construction with the transmission ring mechanism 53 described above, and therefore the transmission ring 100 will not be described in detail. The other features of the device shown in Fig. 5 are identical with those of the device shown in Figs. 1 to 4, inclusive, and need not be described in detail.

As will be understood, the transmission ring is movable from the position shown in full lines in Fig. 5 to the position indicated in dotted lines 101 to vary the speed relation between the drive and driven shafts, and it will be noted that since the effective radii of the drive and driven flanges 99 and 94 are the same in the full line position of the transmission ring shown in Fig. 5, the driven shaft will rotate at the same speed as the drive shaft. In moving the transmission ring from the full line position to the dotted line position in Fig. 5, the effective radius of the drive flange 99 is decreased and the effective diameter of the driven flange 94 is increased, so that the rotational speed of the driven shaft is reduced relative to the rotational speed of the drive shaft. It will thus be apparent that in the embodiment shown in Fig. 5, the driven shaft never can rotate at a speed in excess of that of the drive shaft, which is an important feature of the invention for many installations.

Although we have shown and described a preferred embodiment of our invention, it will be understood that certain parts and elements may be substituted for corresponding parts and elements of our device without departing from the spirit of our invention, and consequently we do not intend to be limited to the specific embodiment disclosed, but desire to be afforded the full scope of the following claims.

We claim as our invention:

1. In a variable-speed transmission, the combination of: a first plate member; means for connecting said first plate member to a drive shaft so as to cause said first plate member to rotate with said drive shaft; a second plate member spaced from said first plate member; means for connecting said second plate member to a driven shaft so as to cause said second plate member to rotate with said driven shaft; rotatable ring means operatively engaging both of said plate members whereby rotation of said first plate member causes rotation of said ring means on a first axis, which in turn causes rotation of said second plate member; means for pivotally supporting said ring means for pivotal movement about a second axis perpendicular to said first axis and into pressure engagement with said plate members; means for moving said ring means while in pressure engagement with said plate members to vary the point of engagement of said ring means with at least one of said plate members so as to vary the rotational speed relation between said plate members; and adjustment means for adjusting the pressure with which said ring means engages said plate members.

2. In a variable-speed transmission, the combination of: a first plate member; means for connecting said first plate member to a drive shaft so as to cause said first plate member to rotate with said drive shaft; a second plate member spaced from said first plate member; means for connecting said second plate member to a driven shaft so as to cause said second plate member to rotate with said driven shaft; rotatable ring means operatively engaging both of said plate members whereby rotation of said first plate member causes rotation of said ring means on a first axis, which in turn causes rotation of said second plate member; supporting means for pivotally supporting said ring means for pivotal movement about a second axis perpendicular to said first axis and into pressure engagement with said plate members; means for moving said ring means while in pressure engagement with said plate members to vary the point of engagement of said ring means with at least one of said plate members so as to vary the rotational speed relation between said plate members; and indicating means connected to said supporting means for indicating the pressure with which said ring means engages said plate members.

3. In a variable-speed transmission, the combination of: a first plate member; means for connecting said first plate member to a drive shaft so as to cause said first plate member to rotate with said drive shaft; a second plate member spaced from said first plate member; means for connecting said second plate member to a driven shaft so as to cause said second plate member to rotate with said driven shaft; rotatable ring means operatively engaging both of said plate members whereby rotation of said first plate member causes rotation of said ring means on a first axis, which in turn causes rotation of said second plate member; supporting means for pivotally supporting said ring means for pivotal movement about a second axis perpendicular to said first axis and into pressure engagement with said plate members; means for moving said ring means while in pressure engagement with said plate members to vary the point of engagement of said ring means with at least one of said plate members so as to vary the rotational speed relation between said plate members; adjusting means for adjusting the pressure with which said ring means engages said plate members; and indicating means connected to said supporting means for indicating the pressure with which said ring means engages said plate members.

4. In a variable-speed transmission, the combination of: a housing having an opening in one wall thereof; a first plate member journaled for rotation in said housing; means for connecting said first plate member to a drive shaft so as to cause said first plate member to rotate with the drive shaft; a second plate member journaled for rotation in said housing and spaced from said first plate member; means for connecting said second plate member to a driven shaft so as to cause said second plate member to rotate with said driven shaft; rotatable ring means in said housing operatively engaging both of said plate members whereby rotation of said first plate member causes rotation of said ring means, which in turn causes rotation of said second plate member; means for supporting said ring means in pressure engagement with said plate members, said supporting means including a cover plate adapted to close said opening in said housing; means for moving said ring means while in pressure engagement with said plate members to vary the point of engagement of said ring means with at least one of said plate members so as to vary the rotational speed relation between said plate members, said means including a control element disposed on the outside of said housing; and means for moving said cover plate on said housing to vary the pressure with which said ring means engages said plate members.

5. In a variable-speed transmission, the combination of: a housing having an opening in one wall thereof; a first plate member journaled for rotation in said housing; means for connecting said first plate member to a drive shaft so as to cause said first plate member to rotate with the drive shaft; a second plate member journaled for rotation in said housing and spaced from said first plate member; means for connecting said second plate member to a driven shaft so as to cause said second plate member to rotate with said driven shaft; rotatable ring means in said housing operatively engaging both of said plate members whereby rotation of said first plate member causes rotation of said ring means, which in turn causes rotation of said second plate member; means for supporting said ring means in pressure engagement with said plate members, said supporting means including a cover plate adapted to close said opening in said housing and being rotatable relative to said housing; means for moving said ring means while in pressure engagement with said plate members to vary the point of engagement of said ring means with at least one of said plate members so as to vary the rotational speed relation between said plate members, said means including a control element disposed on the outside of said housing; and means for rotating said cover plate on said housing to vary the pressure with which said ring means engages said plate members.

6. In a variable-speed transmission, the combination of: a housing having an opening in one wall thereof; a first plate member journaled for rotation in said housing; means for connecting said first plate member to a drive shaft so as to cause said first plate member to rotate with the drive shaft; a second plate member journaled for rotation in said housing and spaced from said first plate member; means for connecting said second plate member to a driven shaft so as to cause said second plate member to rotate with said driven shaft; rotatable ring means in said housing operatively engaging both of said plate members whereby rotation of said first plate member causes rotation of said ring means, which in turn causes rotation of said second plate member; means for supporting said ring means in pressure engagement with said plate members, said supporting means including a cover plate adapted to close said opening in said housing; means for moving said ring means while in pressure engagement with said plate members to vary the point of engagement of said ring means with at least one of said plate members so as to vary the rotational speed relation between said plate members, said means including a control element disposed on the outside of said housing; means for moving said cover plate on said housing to vary the pressure with which said ring means engages said plate members; and means for indicating the pressure with which said ring means engages said plate members.

7. In a variable-speed transmission, the combination of: a housing having an opening in one wall thereof; a first plate member journaled for rotation in said housing; means for connecting said first plate member to a drive shaft so as to cause said first plate member to rotate with the drive shaft; a second plate member journaled for rotation in said housing and spaced from said first plate member; means for connecting said second plate member to a driven shaft so as to cause said second plate member to rotate with said driven shaft; rotatable ring means in said housing operatively engaging both of said plate members whereby rotation of said first plate member causes rotation of said ring means, which in turn causes rotation of said second plate member; means for supporting said ring means in pressure engagement with said plate members, said supporting means including a cover plate adapted to close said opening in said housing and being rotatable relative to said housing; means for moving said ring means while in pressure engagement with said plate members to vary the point of engagement of said ring means with at least one of said plate members so as to vary the rotational speed relation between said plate members, said means including a control element disposed on the outside of said housing; means for rotating said cover plate on said housing to vary the pressure with which said ring means engages said plate members; and means for selectively retaining said cover plate in any desired rotated position relative to said housing.

8. In a variable-speed transmission, the combination of: a first plate member; means for connecting said first plate member to a drive shaft; a second plate member spaced from said first plate member; means for connecting said second plate member to a driven shaft; supporting means; a supporting arm member supported on and depending from said supporting means and having a stub axle fixed to the lower end of said arm member, said arm member depending between said plate members; annular bearing means on said stub axle; rotatable ring means rotatably supported on said bearing means and engaging both of said plate members whereby rotation of said first plate member causes rotation of said ring means, which in turn causes rotation of said second plate member; and means for moving said supporting arm member while said ring means is in engagement with said plate members to vary the points of engagement of said ring means with said plate members so as to vary the rotational speed between said plate members.

CARL E. JOHNSON.
EARL MENDENHALL.
BERNHARD N. PALM.